(12) United States Patent
Gong et al.

(10) Patent No.: US 8,676,801 B2
(45) Date of Patent: Mar. 18, 2014

(54) COMPUTER-IMPLEMENTED SYSTEMS AND METHODS FOR PROCESSING A MULTI-DIMENSIONAL DATA STRUCTURE

(75) Inventors: Qing Gong, Cary, NC (US); Kenneth John Peressini, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 13/220,285

(22) Filed: Aug. 29, 2011

(65) Prior Publication Data

US 2013/0054608 A1    Feb. 28, 2013

(51) Int. Cl.
*G06F 7/00* (2006.01)
*G06F 17/30* (2006.01)

(52) U.S. Cl.
USPC .............................. 707/736; 707/791; 707/802

(58) Field of Classification Search
USPC .......... 707/800, 801, 802, 811, 736, 791, 796
See application file for complete search history.

(56) References Cited

U.S. PATENT DOCUMENTS

| | | | |
|---|---|---|---|
| 5,767,854 A | 6/1998 | Anwar | |
| 5,799,300 A * | 8/1998 | Agrawal et al. | 1/1 |
| 5,918,225 A * | 6/1999 | White et al. | 1/1 |
| 5,926,820 A | 7/1999 | Agrawal et al. | |
| 5,943,677 A * | 8/1999 | Hicks | 707/610 |
| 6,182,060 B1 | 1/2001 | Hedgcock et al. | |
| 6,341,240 B1 | 1/2002 | Bermon et al. | |
| 6,366,199 B1 | 4/2002 | Osborn et al. | |
| 6,456,999 B1 * | 9/2002 | Netz | 1/1 |
| 6,460,026 B1 | 10/2002 | Pasumansky | |
| 6,470,344 B1 | 10/2002 | Kothuri et al. | |
| 6,484,179 B1 | 11/2002 | Roccaforte | |
| 6,546,135 B1 | 4/2003 | Lin et al. | |
| 6,581,068 B1 | 6/2003 | Bensoussan et al. | |
| 6,643,608 B1 | 11/2003 | Hershey et al. | |
| 6,728,724 B1 | 4/2004 | Megiddo et al. | |
| 6,750,864 B1 | 6/2004 | Anwar | |
| 6,898,603 B1 | 5/2005 | Petculescu et al. | |
| 7,016,480 B1 | 3/2006 | Saylor et al. | |
| 7,031,955 B1 | 4/2006 | de Souza et al. | |
| 7,089,266 B2 | 8/2006 | Stolte et al. | |
| 7,133,876 B2 | 11/2006 | Roussopoulos et al. | |
| 7,171,427 B2 | 1/2007 | Witkowski et al. | |
| 7,177,854 B2 | 2/2007 | Chun et al. | |
| 7,430,567 B2 | 9/2008 | Goldstein et al. | |
| 7,660,823 B2 * | 2/2010 | Clover | 707/805 |
| 7,698,314 B2 * | 4/2010 | Croft et al. | 707/607 |
| 7,777,743 B2 | 8/2010 | Pao et al. | |
| 7,831,615 B2 | 11/2010 | Bailey | |
| 7,895,191 B2 | 2/2011 | Colossi et al. | |

(Continued)

OTHER PUBLICATIONS

De Prisco et al., "On Optimal Binary Search Trees", Information Processing Letters, vol. 45, pp. 249-253 (Apr. 1993).

(Continued)

*Primary Examiner* — Robert Beausoliel, Jr.
*Assistant Examiner* — Hexing Liu
(74) *Attorney, Agent, or Firm* — Kilpatrick Townsend & Stockton LLP (57) ABSTRACT

Computer-implemented systems and methods are provided for processing a multi-dimensional data structure. For example, systems and methods are provided for processing the multi-dimensional data structure and allowing cell selection rules related to the multi-dimensional data structure to be resolved efficiently, so that computational cost associated with processing the multi-dimensional data structure can be saved.

33 Claims, 11 Drawing Sheets

(56) References Cited

U.S. PATENT DOCUMENTS

| | | |
|---|---|---|
| 7,904,319 B1 | 3/2011 | Whear et al. |
| 7,996,378 B2 | 8/2011 | Wang et al. |
| 2002/0126545 A1 | 9/2002 | Warren et al. |
| 2003/0028403 A1 | 2/2003 | Olson |
| 2003/0033170 A1 | 2/2003 | Bhatt et al. |
| 2003/0046250 A1 | 3/2003 | Kuettner et al. |
| 2003/0061104 A1 | 3/2003 | Thomson et al. |
| 2003/0093424 A1* | 5/2003 | Chun et al. ............... 707/7 |
| 2003/0105646 A1 | 6/2003 | Siepser |
| 2003/0126143 A1* | 7/2003 | Roussopoulos et al. ...... 707/100 |
| 2003/0208503 A1* | 11/2003 | Roccaforte ............... 707/101 |
| 2004/0111388 A1 | 6/2004 | Boiscuvier et al. |
| 2004/0122689 A1 | 6/2004 | Dailey et al. |
| 2004/0138908 A1 | 7/2004 | Lowe, Jr. et al. |
| 2004/0215626 A1 | 10/2004 | Colossi et al. |
| 2005/0015273 A1 | 1/2005 | Iyer |
| 2005/0066277 A1 | 3/2005 | Leah et al. |
| 2005/0262108 A1 | 11/2005 | Gupta |
| 2006/0184377 A1 | 8/2006 | Tan et al. |
| 2006/0184379 A1 | 8/2006 | Tan et al. |
| 2006/0190432 A1 | 8/2006 | Wang et al. |
| 2006/0212386 A1 | 9/2006 | Willey et al. |
| 2007/0233621 A1 | 10/2007 | de Souza et al. |
| 2008/0288889 A1* | 11/2008 | Hunt et al. ............... 715/810 |
| 2011/0035353 A1 | 2/2011 | Bailey |

OTHER PUBLICATIONS

Kalbfleisch, J.D. et al., "Methods for the Analysis and Prediction of Warranty Claims," Technometrics, vol. 33, No. 33, 25 pp. (Aug. 1991).

Lawless, J.F. et al., "Some Simple Robust Methods for the Analysis of Recurrent Events," IIQP Research Report RR-93-02, 25 pp. (Feb. 1993).

Pedersen, Torben Bach et al., "Multidimensional Database Technology", IEEE, Computer, vol. 34, Issue 12, pp. 40-46 (Dec. 2001).

Thode, Henry C., "Testing for Normality," Chapter 12: Robust Estimation of Location and Scale, 29 pp. (2002).

Wu, Huaiqing et al., "Early Detection of Reliability Problems Using Information From Warranty Databases," Technometrics, vol. 44, No. 2, pp. 1-28 (May 2002).

Business Wire, "Spotfire Launches Spotfire.net, the First Web Portal for Technical Decision-Making Communities" (Mar. 21, 2000).

* cited by examiner

COMPUTER-IMPLEMENTED SYSTEMS AND METHODS FOR PROCESSING A MULTI-DIMENSIONAL DATA STRUCTURE

TECHNICAL FIELD

The present disclosure relates generally to the field of data processing and, more specifically, to computer-implemented systems and methods for processing a multi-dimensional data structure.

BACKGROUND

Data processing technology has evolved to where data can be stored and processed in multidimensional data structures. In a multidimensional data structure, data is often represented as multi-dimensional cubes. Each dimension of a multidimensional cube represents a different type of data. For example, a three-dimensional cube can be used to store travel expense data of an enterprise. A first dimension of the cube may specify travel costs, a second dimension of the cube may specify the months, and a third dimension of the cube may specify divisions of the enterprise. Hence, data in a particular cell of the cube may indicate the travel costs by a particular division of the enterprise during a particular month.

SUMMARY

As disclosed herein, computer-implemented systems and methods are provided for processing a multi-dimensional data structure. For example, systems and methods are provided for processing the multi-dimensional data structure and allowing cell selection rules related to the multi-dimensional data structure to be resolved efficiently, so that computational cost associated with processing the multi-dimensional data structure can be saved.

As another example, data in a multi-dimensional data structure is represented as multi-dimensional cubes. Data regarding a multi-dimensional cube that includes a plurality of multi-dimensional cells are received. A cell selection rule that defines one or more cells to be identified for computer-based operations is received. Cell indices are calculated for the one or more cells defined by the cell selection rule. The calculated cell indices are used to identify the one or more cells in the cube for performing the computer-based operations upon data associated with the identified cells.

As additional examples, a dimension of the cube includes a plurality of dimension members, each dimension member having an offset value that represents a position of the dimension member in the dimension. A cell of the cube includes at least one dimension member from each dimension of the cube. A cell of the cube is identifiable by a cell index associated with the cell. Whether the one or more cells defined by the cell selection rule form a sub-cube is determined, where a cell in a sub-cube shares same dimension members from all but one dimensions of the cube with at least another cell in the sub-cube. For the one or more cells forming a sub-cube, a first cell index for a starting cell of the sub-cube is calculated based on the offset values of dimension members of the starting cell. Cell indices for the remaining cells of the sub-cube are calculated based on the first cell index. The calculated cell indices are used to identify the one or more cells in the cube for performing the computer-based operations upon data associated with the sub-cube.

DETAILED DESCRIPTION

Figure 1:
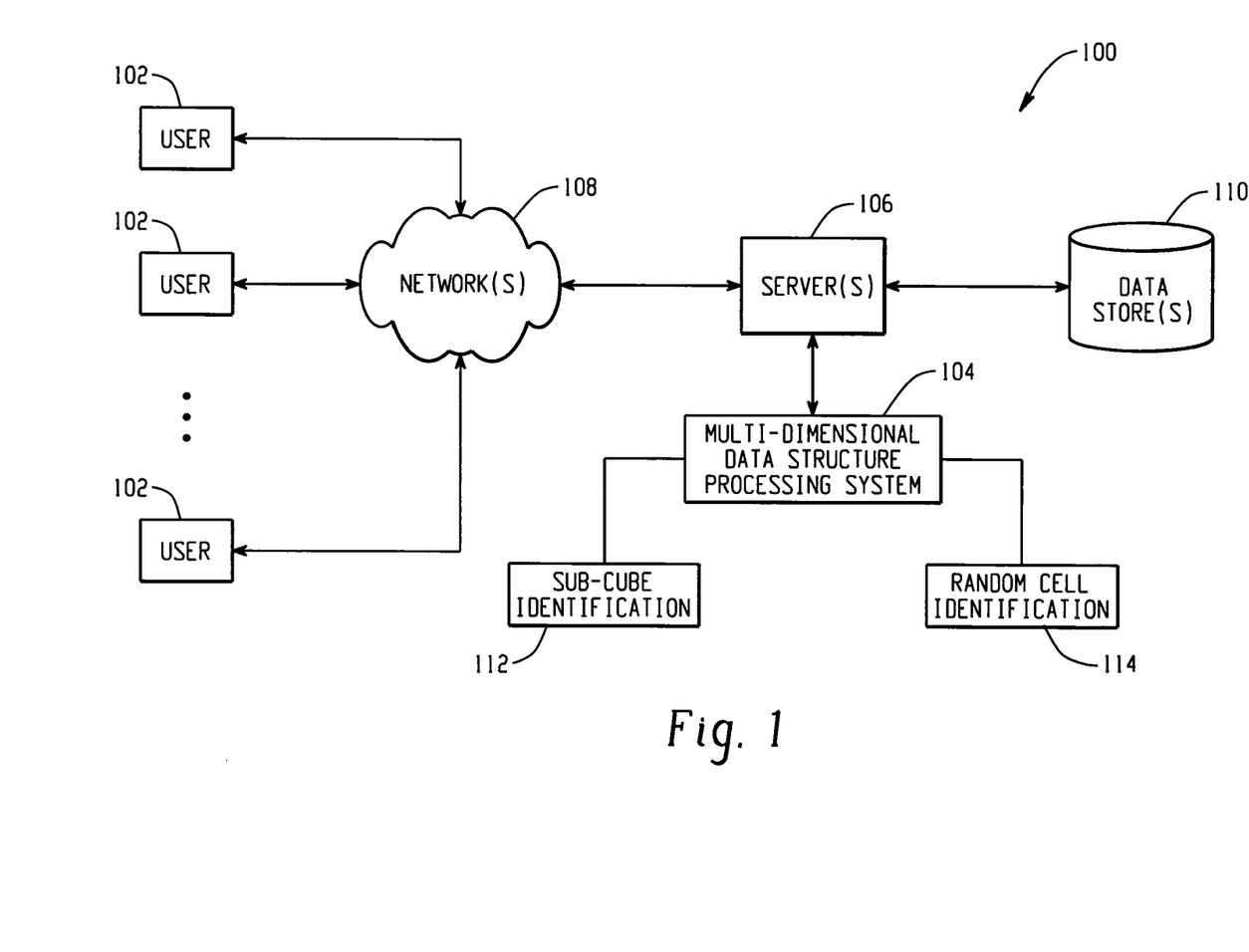
FIG. 1 depicts a computer-implemented environment wherein users can interact with a multi-dimensional data structure processing system hosted on one or more servers through a network.

FIG. 1 depicts a computer-implemented environment wherein users 102 can interact with a multi-dimensional data structure processing system 104 hosted on one or more servers 106 through a network 108. Data in a multi-dimensional data structure is often represented as multi-dimensional cubes. The multi-dimensional data structure processing system 104 can assist the users 102 to identify certain cells in a multi-dimensional cube based on one or more cell selection rules for performing computer-based operations upon data associated with these cells. For example, these cells in the multi-dimensional cube contain sales data. The sales data in certain cells are to be protected from unauthorized overwriting or be visible only to authorized users. The multi-dimensional data structure processing system 104 can assist the users 102 to identify these cells in the multi-dimensional cube and to protect the data associated with these cells from being overwritten by or visible to unauthorized users.

The multi-dimensional data structure processing system 104 can perform different processes for identifying the cells, such as sub-cube identification 112 and random cell identification 114, based on a determination of whether the cells defined by the cell selection rules form a sub-cube. For example, if the cells to be identified are determined not to form a sub-cube, the random cell identification 114 is performed to generate cell indices for the cells to be identified independently. On the other hand, if the cells to be identified are determined to form a sub-cube, the sub-cube identification 112 is performed to generate the cell indices for the cells to be identified using a dependent cell index calculation method.

As shown in FIG. 1, the users 102 can interact with the multi-dimensional data structure processing system 104 through a number of ways, such as over one or more networks 108. One or more servers 106 accessible through the network(s) 108 can host the multi-dimensional data structure processing system 104. The one or more servers 106 can also contain or have access to one or more data stores 110 for storing data for the multi-dimensional data structure processing system 104.

Figure 2:
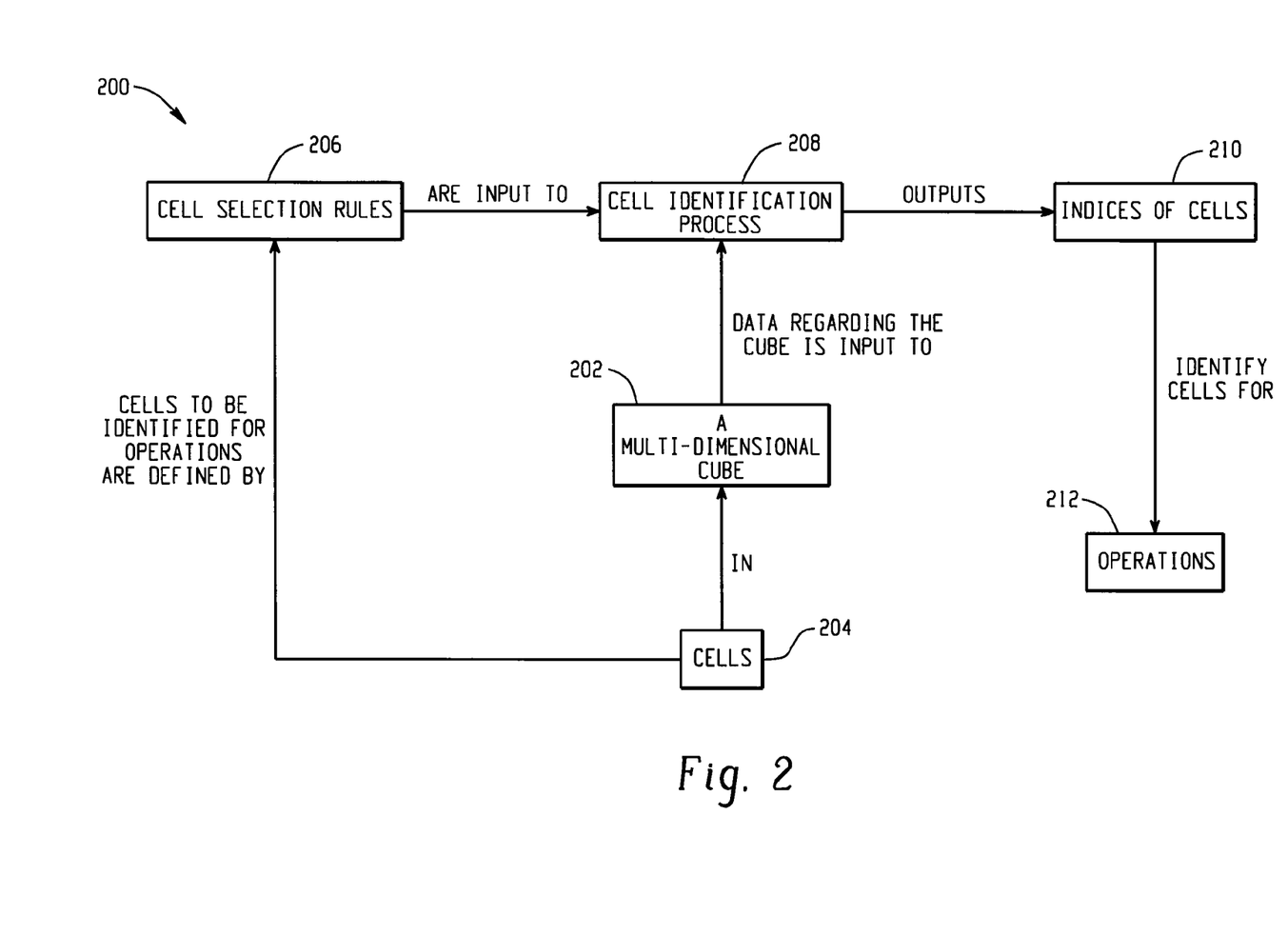
FIG. 2 depicts an example of a configuration of software components for processing a multi-dimensional data structure.

FIG. 2 depicts at 200 an example of a configuration of software components for processing a multi-dimensional data structure. In this example, data in the multi-dimensional data structure is represented as multi-dimensional cubes. Certain cells in a multi-dimensional cube 202 are to be identified based on one or more cell selection rules 206 through a cell identification process 208. Indices of these cells 210 can be generated from the cell identification process 208 for identifying these cells for computer-based operations 212.

The multi-dimensional cube 202 includes a plurality of cells 204 which are identifiable by cell indices associated with the cells. The cell selection rules 206 define certain cells in the cube 202 to be identified for the computer-based operations 212. Data regarding the cube 202 and the cell selection rules 206 are input to the cell identification process 208. The data regarding the cube 202 includes one or more of the following: financial data, sales data, enterprise performance data, inventory data, budget planning data, business intelligence data, and human resources data. Indices of the defined cells 210 are generated based on the data regarding the cube 202 and the cell selection rules 206. The cells defined by the cell selection rules 206 are identified using the generated indices 210. The computer-based operations 212 are performed upon data associated with the identified cells.

Figure 3:
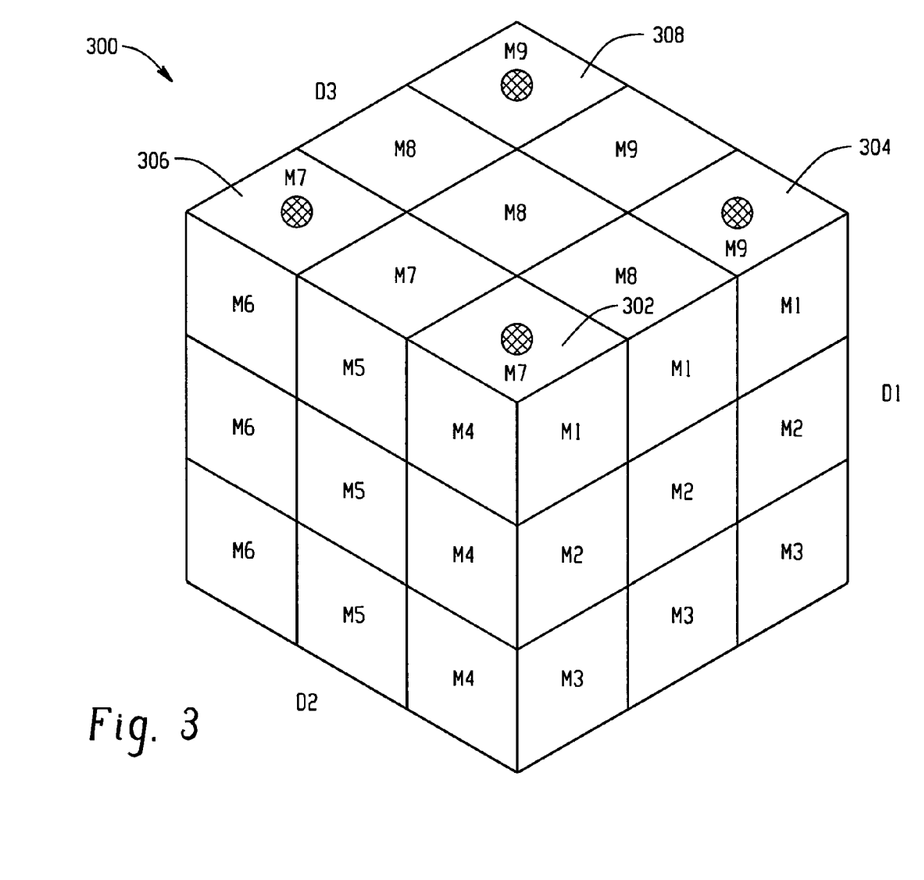
FIG. 3 depicts an example of a multi-dimensional cube.

FIG. 3 depicts an example of a multi-dimensional cube 300. In this example, the cube 300 includes three dimensions D1, D2, and D3. The cube 300 contains 27 (e.g., 3×3×3) cells each of which is identifiable by a cell index associated with the cell. One or more cell selection rules may define certain cells (e.g., cells 302, 304, 306, 308, etc.) in the cube 300 to be identified. Cell indices of these cells to be identified can be determined based on dimensional metadata of the cube 300, such as cardinalities and multipliers.

The number of dimension members in a particular dimension is called a cardinality of the dimension. For example, the dimension D1 includes three dimension members {M1, M2, M3}, the dimension D2 includes three dimension members {M4, M5, M6}, and the dimension D3 includes three dimension members {M7, M8, M9}. Thus, each dimension (e.g., D1, D2, and D3) of the cube 300 has a cardinality of 3.

A multiplier of a particular dimension (e.g., D1) represents a difference in cell indices of two cells which have adjacent dimension members in the particular dimension and share same dimension members in all other dimensions. The multiplier of a dimension (e.g., D1) of a multi-dimensional cube can be determined based on the number of dimension members contained in the dimension and an order of dimensions in the multi-dimensional cube.

Further, each dimension member (e.g., M6, etc.) has an offset value that represents a position of the dimension member in the dimension. For example, if a cell 302 which can be represented by three dimension members (M1, M4, M7) is set to be a starting cell for the cube 300, the dimension member M1 has an offset value of 0 in the dimension D1, M4 has an offset value of 0 in the dimension D2, and M7 has an offset value of 0 in the dimension D3. Then, the dimension member M2 and M3 have offset values of 1 and 2 in the dimension D1, respectively. Similarly, the dimension members M5 and M6 have offset values of 1 and 2 in the dimension D2, respectively. Additionally, the dimension members M8 and M9 have offset values of 1 and 2 in the dimension D3, respectively.

Figure 4:
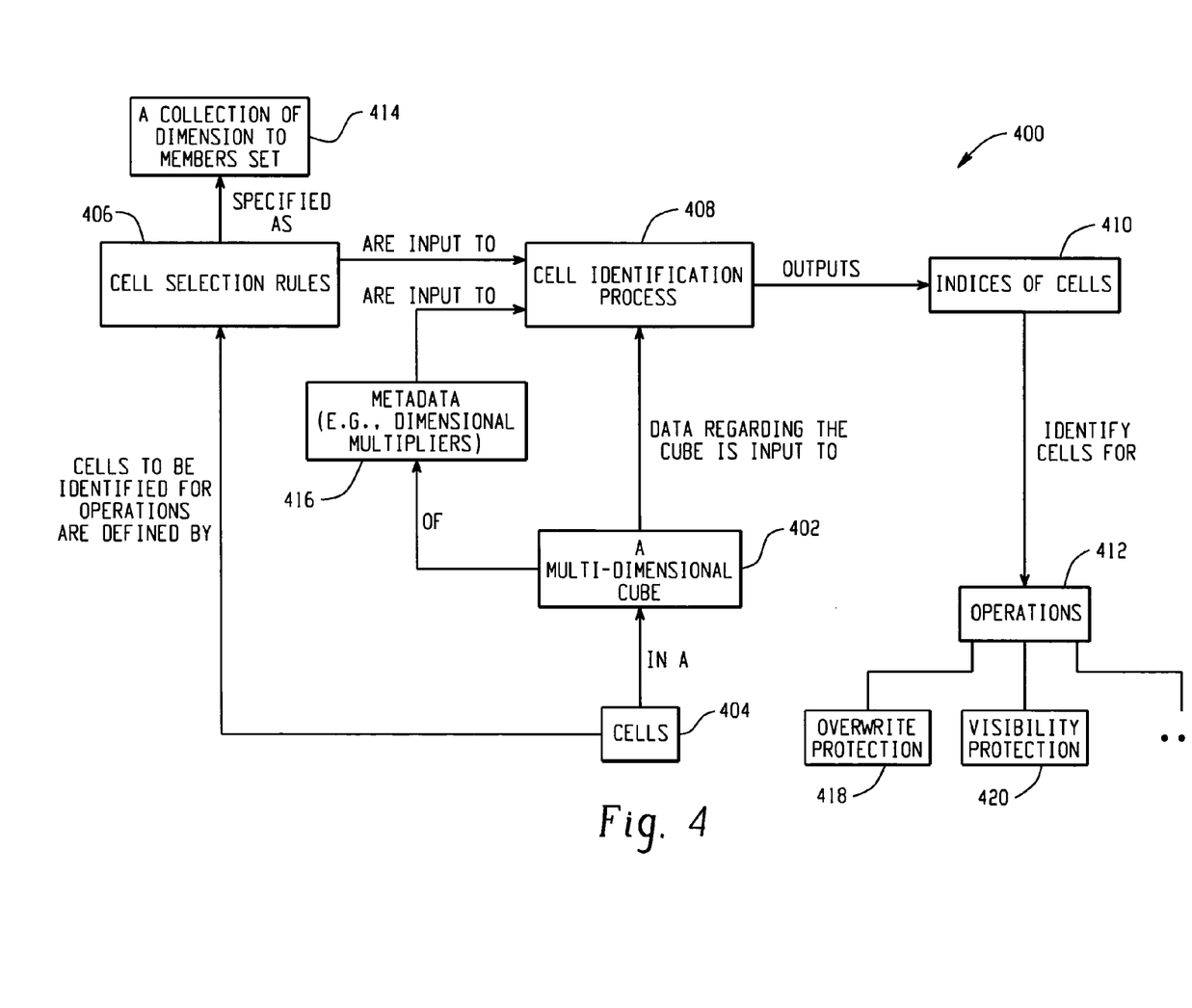
FIG. 4 depicts an example of a configuration of software components for processing a multi-dimensional data structure.

FIG. 4 depicts at 400 an example of a configuration of software components for processing a multi-dimensional data structure. In this example, data in the multi-dimensional data structure is represented as multi-dimensional cubes. Certain cells in a multi-dimensional cube 402 are to be identified based on one or more cell selection rules 406 that are specified as a collection of dimension to members set 414. A cell identification process 408 receives the cell selection rules 406, data regarding the cube 402 and metadata of the cube 416, and outputs indices of the cells 410 for identifying the cells for computer-based operations 412 (e.g., overwrite protection 418, visibility protection 420, etc.).

Among a plurality of cells 404 in the cube 402, the cell selection rules 406 may define certain cells to be identified for the computer-based operations 412 by specifying one or more members for every dimension in the cube. For example, with reference to FIGS. 3 and 4, the cube 402 is a three-dimensional cube similar to the cube 300. The cell selection rules 406 may define cells to be identified as cells with the dimension member M1 in the dimension D1, the dimension members M4 or M6 in the dimension D2, and the dimension members M7 or M9 in the dimension D3.

Data regarding the cube 402, dimensional metadata 416 (e.g., cardinalities, multipliers, etc.), and the cell selection rules 406 are input to the cell identification process 408. The cell identification process 408 generates cell indices of the cells defined by the cell selection rules 406 based on a determination of whether these cells form a sub-cube. If the cells defined by the cell selection rules 406 do not form a sub-cube, a random cell identification is performed in the cell identification process 408 by implementing an independent index calculation method in which a cell index for each cell is calculated independently. On the other hand, if the cells defined by the cell selection rules 406 do form a sub-cube, a sub-cube identification is performed in the cell identification process 408 by implementing a dependent index calculation method in which a cell index for each cell is calculated based on a cell with a known cell index.

Cell indices 410 are output for identifying the cells that are defined by the cell selection rules 406. Depending on whether the cells defined by the cell selection rules 406 form a sub-cube, an independent cell index calculation method or a dependent cell index calculation method may be implemented during the cell identification process 408 for generating the cell indices 410. Computer-based operations 412, including overwrite protection 418 and visibility protection 420, are performed upon data associated with the cells that are identified based on the cell indices 410.

Figure 5:
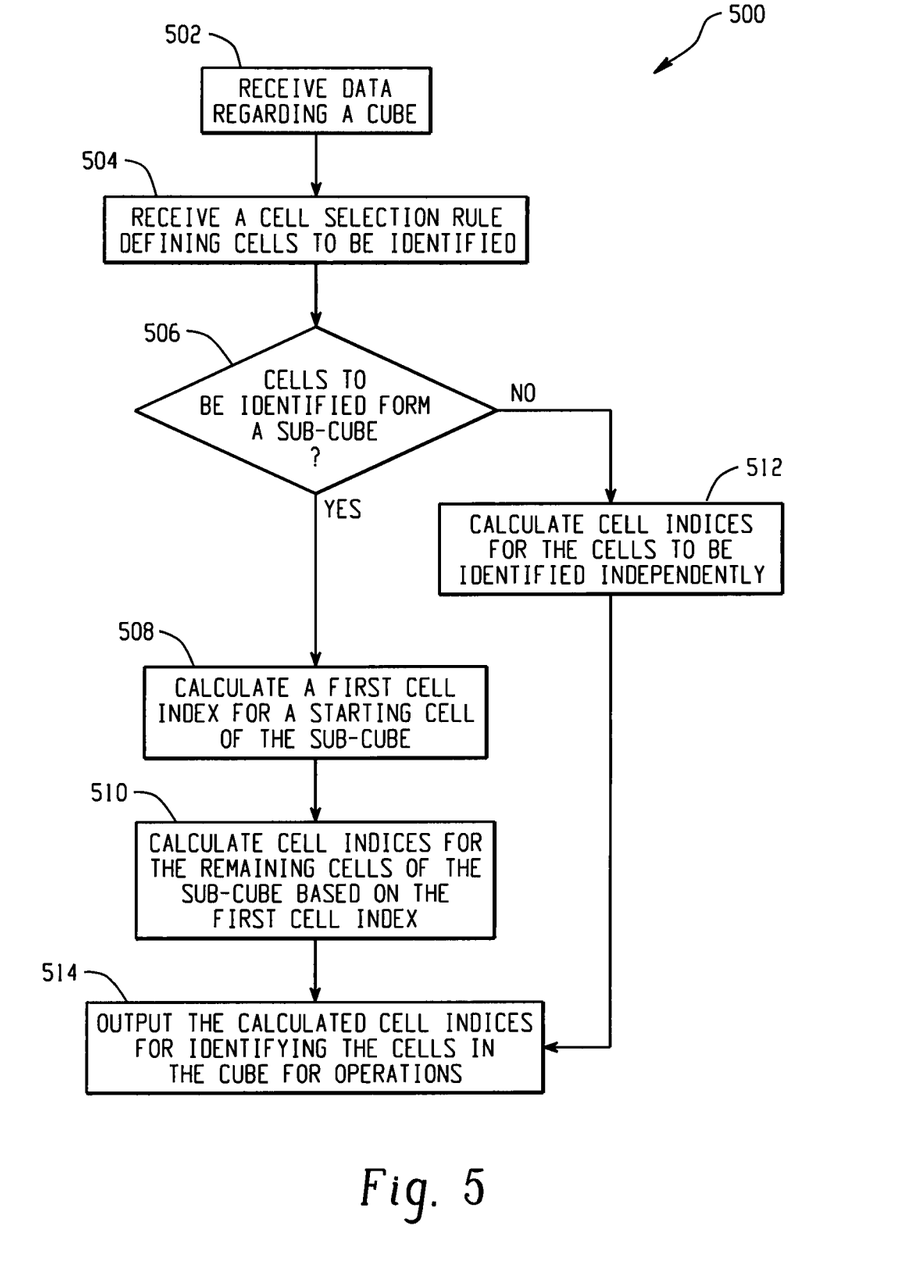
FIG. 5 depicts an example set of operations for processing a multi-dimensional data structure.

From an overall processing perspective, the system operations can be configured such as shown in FIG. 5. FIG. 5 depicts at 500 an example set of operations for processing a multi-dimensional data structure. Data regarding a cube is received at 502. A cell selection rule defining cells to be identified is received at 504. Whether the cells to be identified form a sub-cube is determined at 506. Based on such a determination, cell indices for the cells to be identified are calculated. The calculated cell indices are output for computer-based operations at 514.

Particularly, the cells to be identified can be determined to form a sub-cube if a cell to be identified shares the same dimension members from all but one dimensions of the cube with at least another cell to be identified. If the cells to be identified are determined not to form a sub-cube, cell indices for the cells to be identified are calculated independently at 512. On the other hand, if the cells to be identified are determined to form a sub-cube, cell indices for the cells to be identified are calculated using a dependent cell index calculation method. A first cell index for a starting cell of the sub-cube is calculated based on the offset values of dimension members of the starting cell at 508. Then cell indices for the remaining cells of the sub-cube are calculated based on the first cell index at 510. The remaining cells of the sub-cube can be traversed sequentially based on an order of cell indices in the multi-dimensional cube.

Figure 6:
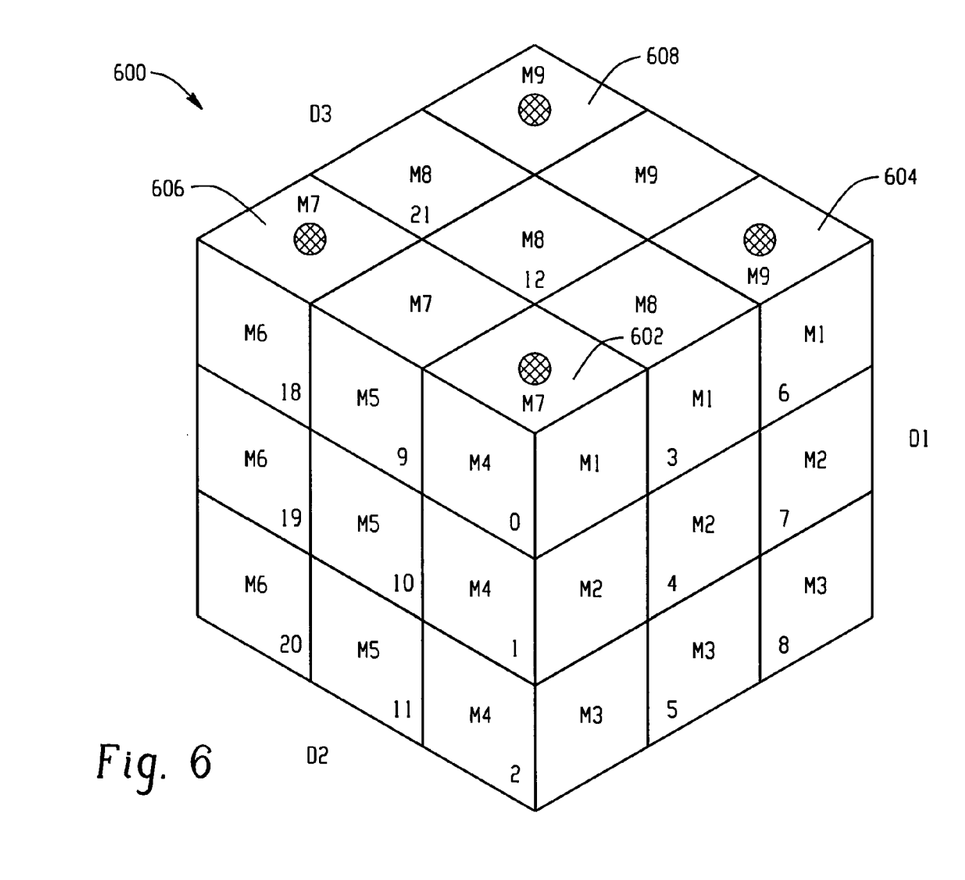
FIG. 6 depicts an example of a multi-dimensional cube for which cell indices are generated.

FIG. 6 depicts an example of a multi-dimensional cube 600 for which cell indices are generated. In this example, the cube 600 includes three dimensions D1, D2, and D3, and contains 27 (e.g., 3×3×3) cells each of which is identifiable by a cell index associated with the cell. Certain cells (e.g., cells 602, 604, 606, 608, etc.) in the cube 600 are defined by one or more cell selection rules to be identified. Cell indices can be calculated based on dimensional metadata of the cube 600, such as cardinalities and multipliers, for identifying the cells that are defined by the cell selection rules.

Each dimension (e.g., D1, D2, and D3) of the cube 600 has a multiplier which can be determined based on the number of dimension members contained in the dimension and an order of dimensions in the cube 600. For example, the multipliers for the dimensions (e.g., D1, D2 and D3) can be calculated using the following example program, where an input parameter is "dimCardinalities" that represents the cardinalities of the dimensions of a multi-dimensional cube, and an output parameter is "dimMultipliers" which represents the multipliers of the dimensions of the multi-dimensional cube.

```
private int setMultipliers(int[ ] dimCardinalities, int[ ] dimMultipliers)
{
    for (int i = dimCardinalities.length – 1; i >= 0; i--)
    {
        if (i == dimCardinalities.length – 1)
        {
            dimMultipliers[i] = 1;
        } else {
            dimMultipliers[i] = dimCardinalities[i + 1] * dimMultipliers[i + 1];
        }
    }
    if (dimCardinalities.length > 0)
    {
        return dimCardinalities[0] * dimMultipliers[0];
    }
    return 0;
}
```

For the cube 600, the multipliers are determined to be 1 for the dimension D1, 9 for the dimension D2, and 3 for the dimension D3.

If the cells to be identified are determined not to form a sub-cube, based on the cardinalities and the multipliers, the cell indices of the cells to be identified can be determined using an independent calculation method as follows:

$$\text{flatIndex} = c_1 \cdot d_1 + c_2 \cdot d_2 + c_3 \cdot d_3 + \ldots + c_n \cdot d_n \quad (1)$$

where flatIndex represents a cell index for a cell to be identified, n represents the number of dimensions, $c_1 \ldots c_n$ are offsets values of dimension members of the cell to be identified, and $d_1 \ldots d_n$ are multipliers for the dimensions of a multi-dimensional cube that contains the cell.

An example program may be used to implement Equation 1 as follows, where input parameters are "dimCardinalities" and "dimMultipliers," an output parameter is "flatIndex" which represents a cell index of a cell to be identified, and "cv" represents the offset values of dimension members of the cell.

```
private int normalize(int[ ] cv, int[ ] dimCardinalities,
    int[ ] dimMultipliers)
{
    int flatIndex = 0;
    for (int i = 0; i < dimCardinalities.length; i++)
    {
        flatIndex += cv[i] * dimMultipliers[i];
    }
    return flatIndex;
}
```

Accordingly, the cell indices of the cells in the cube 600 may be determined using Equation 1 and the related program based on the cardinalities and the calculated multipliers (e.g., 1 for the dimension D1, 9 for the dimension D2, and 3 for the dimension D3). The cell 602 is a starting cell of which offset values of the dimension members (e.g., M1, M4 and M7) are zeros. Table 1 shows the calculated cell indices of the cells in the cube 600.

TABLE 1

| Cell index | Dimension Members | Offset values |
|---|---|---|
| 0 | M1, M4, M7 | 0, 0, 0 |
| 1 | M2, M4, M7 | 1, 0, 0 |
| 2 | M3, M4, M7 | 2, 0, 0 |
| 3 | M1, M4, M8 | 0, 0, 1 |
| 4 | M2, M4, M8 | 1, 0, 1 |
| 5 | M3, M4, M8 | 2, 0, 1 |
| 6 | M1, M4, M9 | 0, 0, 2 |
| 7 | M2, M4, M9 | 1, 0, 2 |
| 8 | M3, M4, M9 | 2, 0, 2 |
| 9 | M1, M5, M7 | 0, 1, 0 |
| 10 | M2, M5, M7 | 1, 1, 0 |
| 11 | M3, M5, M7 | 2, 1, 0 |
| 12 | M1, M5, M8 | 0, 1, 1 |
| 13 | M2, M5, M8 | 1, 1, 1 |
| 14 | M3, M5, M8 | 2, 1, 1 |
| 15 | M1, M5, M9 | 0, 1, 2 |
| 16 | M2, M5, M9 | 1, 1, 2 |
| 17 | M3, M5, M9 | 2, 1, 2 |
| 18 | M1, M6, M7 | 0, 2, 0 |
| 19 | M2, M6, M7 | 1, 2, 0 |
| 20 | M3, M6, M7 | 2, 2, 0 |
| 21 | M1, M6, M8 | 0, 2, 1 |
| 22 | M2, M6, M8 | 1, 2, 1 |
| 23 | M3, M6, M8 | 2, 2, 1 |
| 24 | M1, M6, M9 | 0, 2, 2 |
| 25 | M2, M6, M9 | 1, 2, 2 |
| 26 | M3, M6, M9 | 2, 2, 2 |

On the other hand, if the cells to be identified are determined to form a sub-cube, then the cell indices of the cells to be identified can be calculated using a dependent cell index calculation method as follows:

$$\text{flatIndex2} = \text{flatIndex1} + \text{dimMultipliers}[\text{dim}] \times (\text{rank2} - \text{rank1}) \quad (2)$$

where flatIndex2 represents a cell index of a cell to be identified, flatIndex1 represents a known cell index of a base cell, rank1 represents an offset value of a dimension member of the base cell, rank2 represents an offset value of a dimension member of the cell to be identified that is in the same dimension as the dimension member of the based cell, and dimMultipliers[ ] represent multipliers of the dimensions of a multi-dimensional cube.

Figure 7:
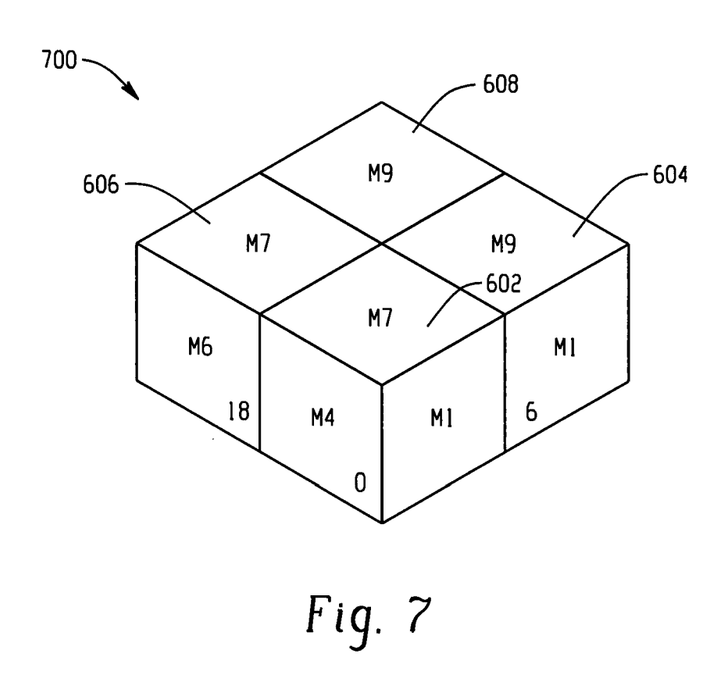
FIG. 7 depicts an example of a diagram for a sub-cube formed by certain cells.

As an example, a cell selection rule defines cells to be identified as cells with the dimension member M1 in the dimension D1, the dimension members M4 or M6 in the dimension D2, and the dimension members M7 or M9 in the dimension D3. As shown in FIG. 6, the cells 602, 604, 606 and 608 are the cells defined by the cell selection rule. The cells 602, 604, 606 and 608 can be represented using the dimension members as (M1, M4, M7), (M1, M4, M9), (M1, M6, M7) and (M1, M6, M9), respectively. The cells 602, 604, 606 and 608 form a sub-cube since each of these four cells shares same dimension members from all but one dimensions of the cube 600 with at least another of the four cells. FIG. 7 depicts an example of a diagram for a sub-cube 700 formed by the cells 602, 604, 606 and 608.

The cell indices of these four cells can be determined using the dependent cell index calculation method. With reference to FIGS. 6 and 7, the cell 602 is the starting cell of the sub-cube 700, with the constraint of the cell selection rule. The cell index of the cell 602 can be first determined using the independent cell index calculation method (e.g., Equation 1 and the related example program). As shown in Table 1, the cell index of the cell 602 is 0. Then, based on the known cell index of the cell 602, the cell indices of the remaining cells 604, 606 and 608 in the sub-cube 700 can be determined using Equation 2.

For example, the cell 604 is different from the cell 602 only in the dimension D3, where the cell 604 has the dimension member M9, and the cell 602 has the dimension member M7. As discussed above, the dimension D3 has a multiplier of 3. The dimension member M7 has an offset value of 0, and the dimension member M9 has an offset value of 2 in the dimension D3. Thus, according to Equation 2, the cell index of the cell 604 can be determined, using the cell 602 as the base cell, to be:

Cell index of cell 604=Cell index of cell 602+dim-Multipliers[$D3$]×($M9-M7$)=0+3×2=6.

Similarly, the cell 606 is different from the cell 602 only in the dimension D2, where the cell 606 has the dimension member M6, and the cell 602 has the dimension member M4. The dimension D2 has a multiplier of 9. The dimension member M4 has an offset value of 0, and the dimension member M6 has an offset value of 2 in the dimension D2. Thus, according to Equation 2, the cell index of the cell 606 can be determined, using the cell 602 as the base cell, to be:

Cell index of cell 606=Cell index of cell 602+dim-Multipliers[$D2$]×($M6-M4$)=0+9×2=18.

Additionally, the cell 608 is different from the cell 606 only in the dimension D3, where the cell 608 has the dimension member M9, and the cell 606 has the dimension member M7. The dimension D3 has a multiplier of 3. The dimension member M7 has an offset value of 0, and the dimension member M9 has an offset value of 2 in the dimension D3. Thus, according to Equation 2, the cell index of the cell 608 can be determined, using the cell 606 as the base cell, to be:

Cell index of cell 608=Cell index of cell 606+dim-Multipliers[$D3$]×($M9-M7$)=18+3×2=24.

As such, the cell indices of the cells defined by the cell selection rules are calculated for identifying these cells for the computer-based operations.

Figure 8:
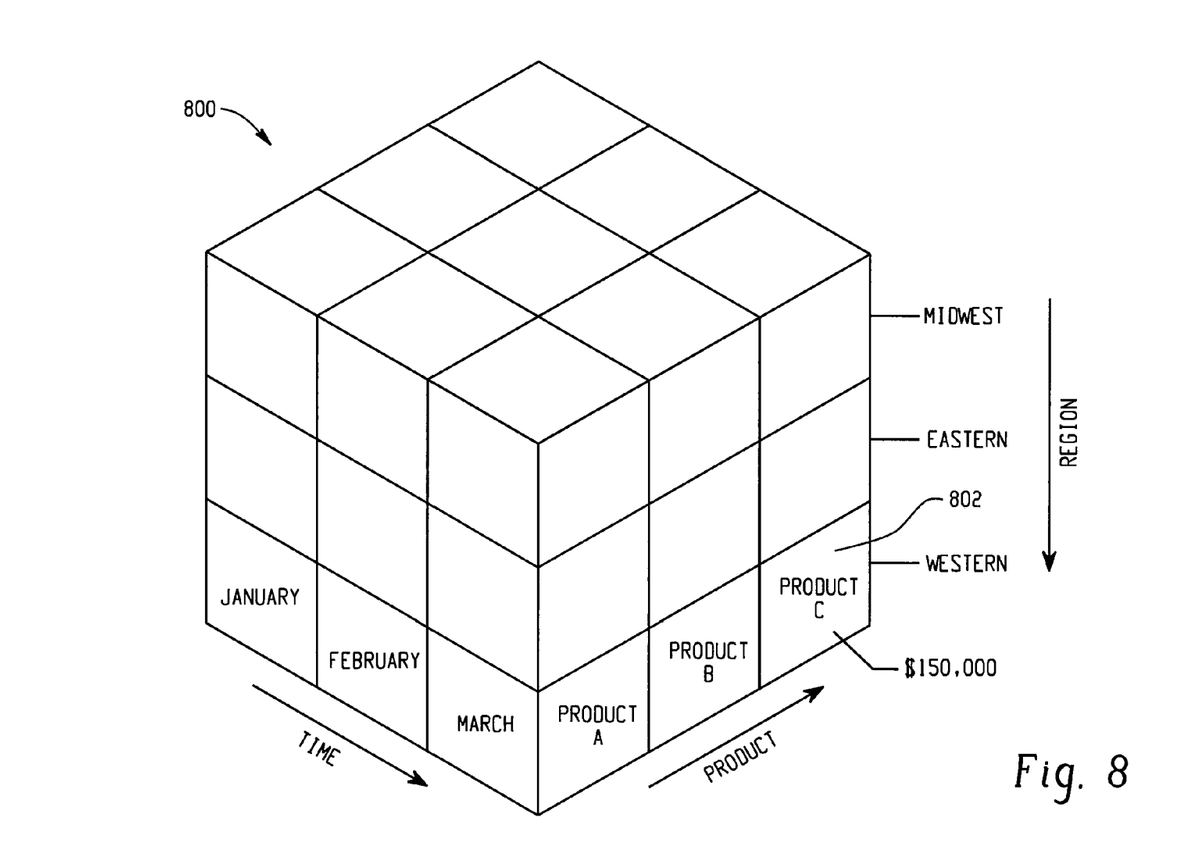
FIG. 8 depicts an example of a diagram for a multi-dimensional cube representing sales data of an enterprise.

FIG. 8 depicts an example of a diagram for a multi-dimensional cube 800 representing sales data of an enterprise. In this example, the cube 800 includes three dimensions: "time," "product," and "region." The "time" dimension represents time periods related to the sales data, the "product" dimension specifies product-related information, and the "region" dimension represents geographical information associated with the sales data. Any number of dimensions may be added to the cube 800 for storing additional data, e.g., customer, costs, sales personnel, etc.

Each dimension of the cube 800 includes a plurality of dimension members. For example, the "time" dimension includes three dimension members: January, February, and March. The "product" dimension includes dimension members: product A, product B, and product C. Additionally, the "region" dimension includes dimension members: Midwest, Eastern, and Western. For example, the sales data stored in the cell 802 indicates the sales of the product C in the Western region in March amounts to $15,000.

Figure 9:
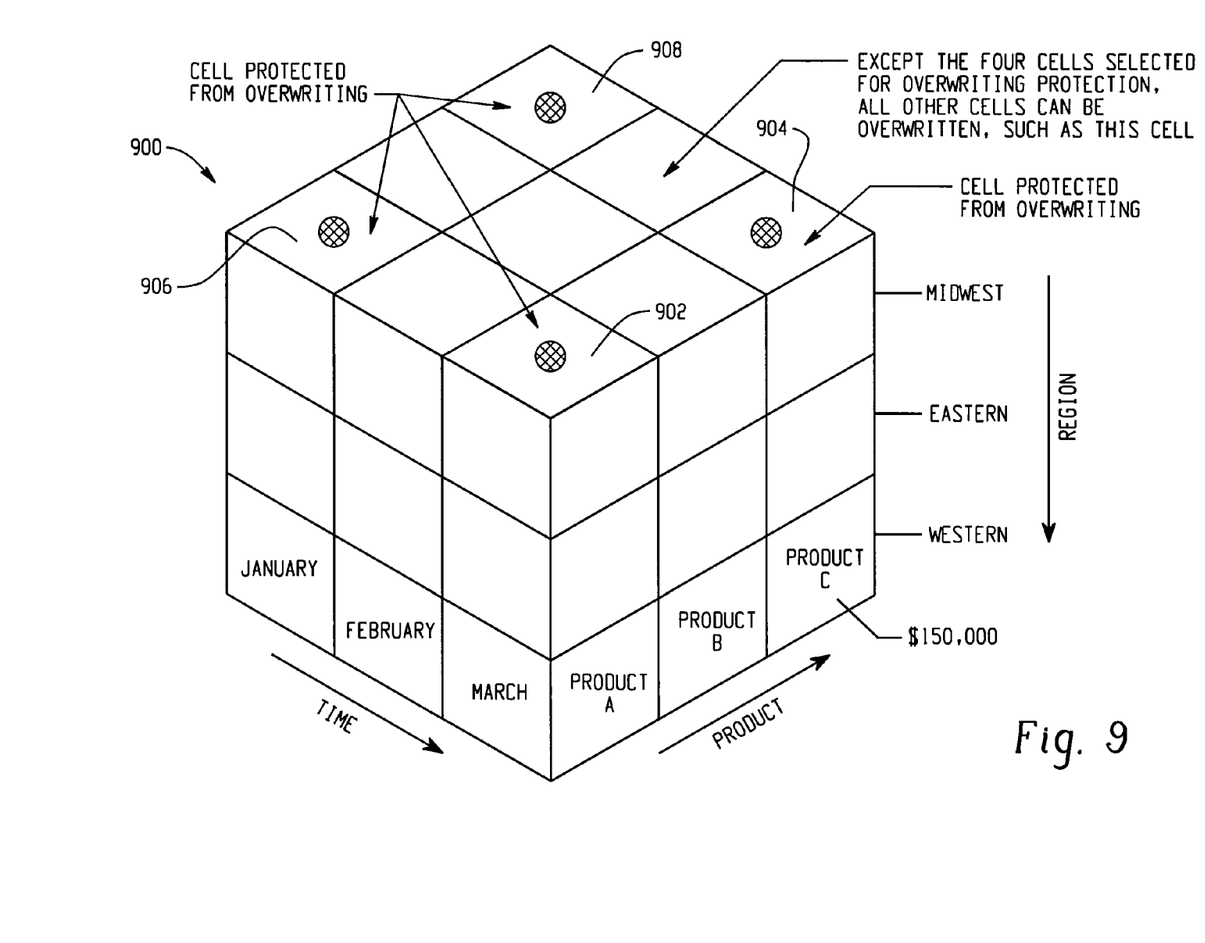
FIGS. 9 and 10 depict examples of diagrams showing particular cells are identified for computer-based operations.
Figure 10:
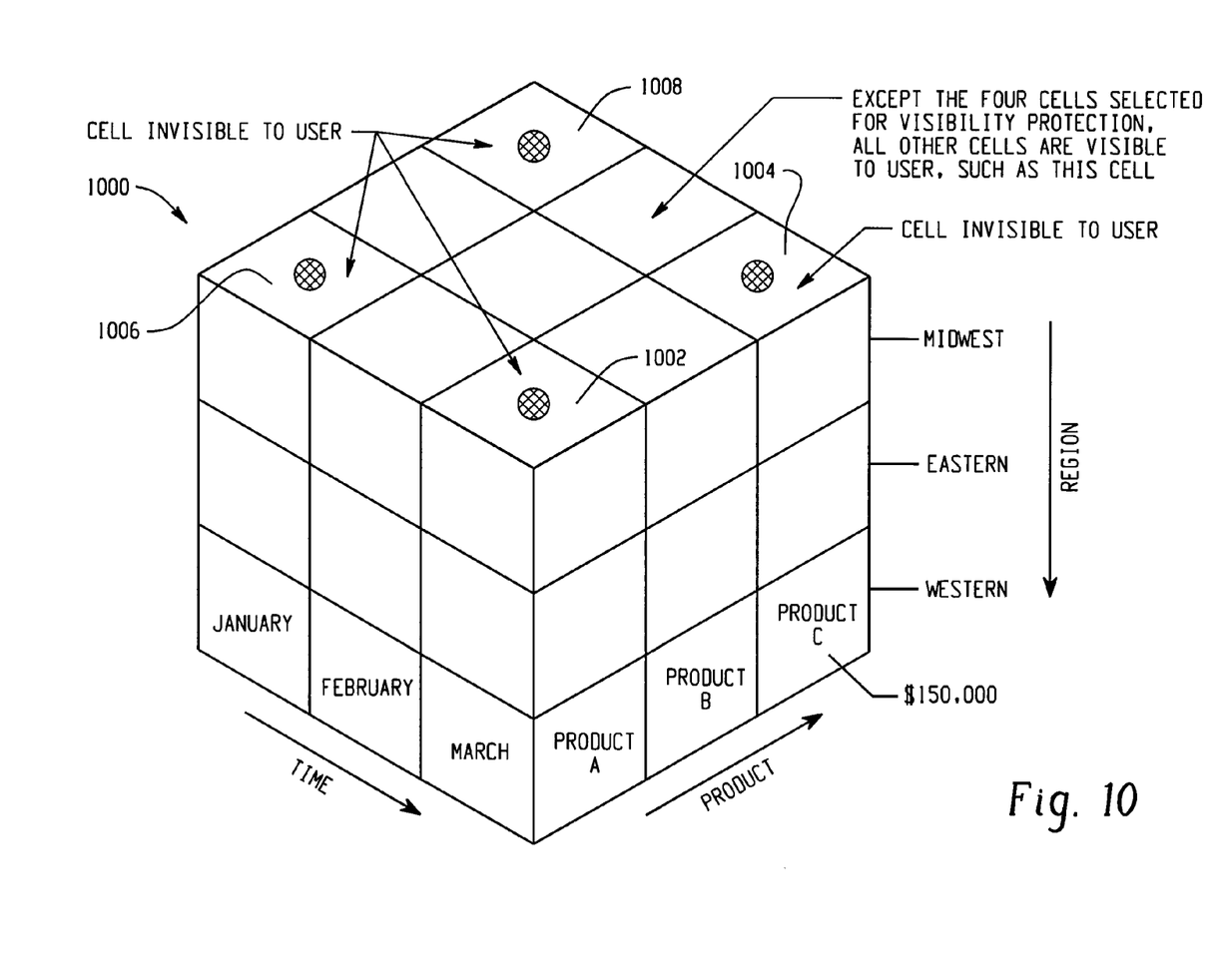

Computer-based operations are often needed to be performed upon data associated with certain cells of a multi-dimensional cube. FIGS. 9 and 10 depict examples of diagrams showing particular cells are identified for computer-based operations.

As shown in FIG. 9, the cube 900 includes three dimensions—"time," "product" and "region" each of which includes a hierarchy of dimension members. For example, the "time" dimension includes three dimension members: January, February, and March. The "product" dimension includes dimension members: product A, product B, and product C. Additionally, the "region" dimension includes dimension members: Midwest, Eastern, and Western.

Four cells 902, 904, 906 and 908 are defined by one or more cell selection rules to be identified for overwriting protection. That is, data contained in these four cells are to be protected from unauthorized overwriting, while data contained in all other cells of the cube 900 can be overwritten. As shown in FIG. 9, the cells 902, 904, 906 and 908 form a sub-cube. Thus, cell indices of these cells can be determined, using the dependent cell index calculation method, for identifying these cells for overwriting protection.

As shown in FIG. 10, four cells 1002, 1004, 1006 and 1008 in the cube 1000 are defined by one or more cell selection rules to be identified for visibility protection. That is, data contained in these four cells are to be made invisible to unauthorized users, while data contained in all other cells of the cube 1000 are visible to any users. As shown in FIG. 10, the cells 1002, 1004, 1006 and 1008 form a sub-cube, and thus cell indices of these cells can be determined using the dependent cell index calculation method.

Figure 11:
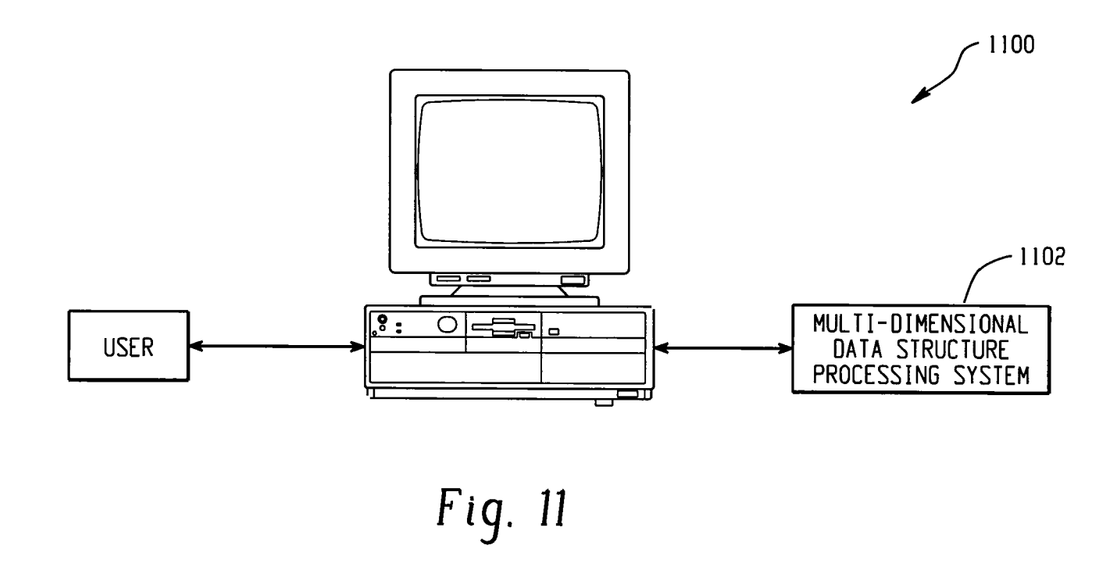
FIG. 11 depicts a multi-dimensional data structure processing system provided on a stand-alone computer for access by a user.

This written description uses examples to disclose the invention, including the best mode, and also to enable a person skilled in the art to make and use the invention. The patentable scope of the invention may include other examples. For example, a computer-implemented system and method can be configured for reducing computational cost associated with resolving a cell selection rule applied to one or more multi-dimensional data structures. As another example, a computer-implemented system and method can be configured for reducing computational cost associated with resolving a number of cell selection rules applied to one or more multi-dimensional data structures. As another example, a computer-implemented system and method can be configured such that a multi-dimensional data structure processing system 1102 can be provided on a stand-alone computer for access by a user, such as shown at 1100 in FIG. 11.

As another example, the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

The invention claimed is:

1. A computer-implemented method, comprising:
   receiving, in a computing system, data associated with a multi-dimensional cube, wherein the multi-dimensional cube includes multiple cells, and wherein each of the cells is referenced by an index number;
   receiving a cell selection rule;
   identifying one or more cells within the multi-dimensional cube, wherein identifying is based on the received cell selection rule and is performed on a computing device, wherein each cell is associated with multiple dimensions in the multi-dimensional cube, wherein each dimension includes a plurality of dimension members, and wherein each dimension member is associated with one or more offset values;
   determining that the identified cells form a sub-cube within the multi-dimensional cube, wherein determining includes finding that two of the identified cells share same dimension members from all but one dimension of the multi-dimensional cube;
   calculating, with one or more computer processors, the index number that references a start cell in the sub-cube, wherein calculating the index number that references the start cell includes using offset values associated with dimension members associated with the start cell;
   calculating, with the one or more computing processors, the index numbers that reference each other cell in the sub-cube, wherein calculating the index numbers includes using the index number that references the start cell and involves:

calculating flatIndex2=flatIndex1+dimMultipliers[dim]×(rank2−rank1), wherein:
      flatIndex2 represents a cell index of a cell to be identified,
      flatIndex1 represents a known cell index of a base cell,
      rank1 represents an offset value of a dimension member of the base cell,
      rank2 represents an offset value of a dimension member of the cell to be identified that is in a same dimension as the dimension member of the base cell,
      dim represents the dimensions of the multi-dimensional cube; and
      dimMultipliers[dim] represent multipliers of the dimensions of the multi-dimensional cube; and
   outputting the cell index numbers for the sub-cube, wherein the outputted cell index numbers identify the cells in the sub-cube.

2. The method of claim 1, wherein the multi-dimensional cube is a multi-dimensional data structure.

3. The method of claim 1, wherein the cell indices in the sub-cube are ordered, and wherein the cells in the sub-cube are sequentially transversable using an order of the index numbers.

4. The method of claim 1, wherein an offset value represents a position of a dimension member in a dimension.

5. The method of claim 1, wherein calculating the index of each other cell in the sub-cube involves calculating flatIndex2.

6. The method of claim 5, wherein each dimension is associated with a multiplier, and wherein calculating flatIndex2 includes using the multiplier associated with one of the dimensions.

7. The method of claim 6, wherein each dimension is characterized by a cardinality that represents a quantity of dimension members included in the dimension.

8. The method of claim 7, further comprising:
   for each dimension, determining the associated dimension multiplier based on the cardinality of the dimension.

9. The method of claim 8, wherein using the dependent cell index calculation algorithm further includes:
   determining a rank difference between two of the cells of the sub-cube, wherein the rank difference is associated with a first one of the dimensions; and
   obtaining a product by multiplying the rank difference by the dimension multiplier associated with the first one of the dimensions.

10. The method of claim 9, wherein using the dependent cell index calculation algorithm further includes:
   adding the product to an index number previously computed with respect to one of the cells of the sub-cube.

11. The method of claim 1, wherein the outputted cell indices are used to perform one or more operations on data associated with the sub-cube within the multi-dimensional cube.

12. A system, comprising:
   one or more processors;

a non-transitory computer-readable storage medium including instructions configured to cause the one or more processors to perform operations, including:

receiving data associated with a multi-dimensional cube, wherein the multi-dimensional cube includes multiple cells, and wherein each of the cells is referenced by an index number;

receiving a cell selection rule;

identifying one or more cells within the multi-dimensional cube, wherein identifying is based on the received cell selection rule, wherein each cell is associated with multiple dimensions in the multi-dimensional cube, wherein each dimension includes a plurality of dimension members, and wherein each dimension member is associated with one or more offset values;

determining that the identified cells form a sub-cube within the multi-dimensional cube, wherein determining includes finding that two of the identified cells share same dimension members from all but one dimension of the multi-dimensional cube;

calculating the index number that references a start cell in the sub-cube, wherein calculating the index number that references the start cell includes using offset values associated with dimension members associated with the start cell;

calculating the index numbers that reference each other cell in the sub-cube, wherein calculating the index numbers includes using the index number that references the start cell and involves:

calculating flatIndex2=flatIndex1+dimMultipliers[dim]×(rank2−rank1), wherein:
flatIndex2 represents a cell index of a cell to be identified,
flatIndex1 represents a known cell index of a base cell,
rank1 represents an offset value of a dimension member of the base cell,
rank2 represents an offset value of a dimension member of the cell to be identified that is in a same dimension as the dimension member of the base cell,
dim represents the dimensions of the multi-dimensional cube; and
dimMultipliers[dim] represent multipliers of the dimensions of the multi-dimensional cube; and outputting the cell index numbers for the sub-cube, wherein the outputted cell index numbers identify the cells in the sub-cube.

13. The system of claim 12, wherein the multi-dimensional cube is a multi-dimensional data structure.

14. The system of claim 12, wherein the cell indices in the sub-cube are ordered, and wherein the cells in the sub-cube are sequentially transversable using an order of the index numbers.

15. The system of claim 12, wherein an offset value represents a position of a dimension member in a dimension.

16. The system of claim 12, wherein calculating the index of each other cell in the sub-cube involves calculating flatIndex2.

17. The system of claim 13, wherein each dimension is associated with a multiplier, and wherein using the dependent cell index calculation algorithm includes calculating flatIndex2.

18. The system of claim 17, wherein each dimension is characterized by a cardinality that represents a quantity of dimension members included in the dimension.

19. The system of claim 18, wherein the operations further include:
for each dimension, determining the associated dimension multiplier based on the cardinality of the dimension.

20. The system of claim 19, wherein using the dependent cell index calculation algorithm further includes:
determining a rank difference between two of the cells of the sub-cube, wherein the rank difference is associated with a first one of the dimensions; and
obtaining a product by multiplying the rank difference by the dimension multiplier associated with the first one of the dimensions.

21. The system of claim 20, wherein using the dependent cell index calculation algorithm further includes:
adding the product to an index number previously computed with respect to one of the cells of the sub-cube.

22. The system of claim 12, wherein the outputted cell indices are used to perform one or more operations on data associated with the sub-cube within the multi-dimensional cube.

23. A computer-program product, tangibly embodied in a non-transitory machine-readable storage medium, including instructions configured to cause a data processing apparatus to:

receive data associated with a multi-dimensional cube, wherein the multi-dimensional cube includes multiple cells, and wherein each of the cells is referenced by an index number;

receive a cell selection rule;

identify one or more cells within the multi-dimensional cube, wherein identifying is based on the received cell selection rule, wherein each cell is associated with multiple dimensions in the multi-dimensional cube, wherein each dimension includes a plurality of dimension members, and wherein each dimension member is associated with one or more offset values;

determine that the identified cells form a sub-cube within the multi-dimensional cube, wherein determining includes finding that two of the identified cells share same dimension members from all but one dimension of the multi-dimensional cube;

calculate the index number that references a start cell in the sub-cube, wherein calculating the index number that references the start cell includes using offset values associated with dimension members associated with the start cell;

calculate the index numbers that reference each other cell in the sub-cube, wherein calculating the index numbers includes using the index number that references the start cell and involves:

calculating flatIndex2=flatIndex1+dimMultipliers[dim]×(rank2−rank1), wherein:
flatIndex2 represents a cell index of a cell to be identified,
flatIndex1 represents a known cell index of a base cell,
rank1 represents an offset value of a dimension member of the base cell,
rank2 represents an offset value of a dimension member of the cell to be identified that is in a same dimension as the dimension member of the base cell,
dim represents the dimensions of the multi-dimensional cube; and
dimMultipliers[dim] represent multipliers of the dimensions of the multi-dimensional cube; and output the cell index numbers for the sub-cube, wherein the outputted cell index numbers identify the cells in the sub-cube.

24. The computer-program product of claim 23, wherein the multi-dimensional cube is a multi-dimensional data structure.

25. The computer-program product of claim 23, wherein the cell indices in the sub-cube are ordered, and wherein the cells in the sub-cube are sequentially transversable using an order of the index numbers.

26. The computer-program product of claim 23, wherein an offset value represents a position of a dimension member in a dimension.

27. The computer-program product of claim 23, wherein calculating the index of each other cell in the sub-cube involves calculating flatIndex2.

28. The computer-program product of claim 27, wherein each dimension is associated with a multiplier, and wherein calculating flatIndex2 includes using the multiplier associated with one of the dimensions.

29. The computer-program product of claim 28, wherein each dimension is characterized by a cardinality that represents a quantity of dimension members included in the dimension.

30. The computer-program product of claim 29, wherein the instructions are further configured to cause the data processing apparatus to:
determine, for each dimension, the associated dimension multiplier based on the cardinality of the dimension.

31. The computer-program product of claim 30, wherein using the dependent cell index calculation algorithm further includes:
determining a rank difference between two of the cells of the sub-cube, wherein the rank difference is associated with a first one of the dimensions; and
obtaining a product by multiplying the rank difference by the dimension multiplier associated with the first one of the dimensions.

32. The computer-program product of claim 31, wherein using the dependent cell index calculation algorithm further includes:
adding the product to an index number previously computed with respect to one of the cells of the sub-cube.

33. The computer-program product of claim 23, wherein the outputted cell indices are used to perform one or more operations on data associated with the sub-cube within the multi-dimensional cube.

* * * * *